United States Patent [19]
Bajorek et al.

[11] Patent Number: 5,182,541
[45] Date of Patent: Jan. 26, 1993

[54] REMOTE CONTROLLED THEFT DETERRENT SYSTEM

[75] Inventors: Jay E. Bajorek, Wadsworth; Austin E. Cox, Medina; Eugene S. Kovack, Wadsworth; Michael S. Lionetti, Wadsworth; Joe Smisko, Wadsworth, all of Ohio

[73] Assignee: Concept Five, Inc., Wadsworth, Ohio

[21] Appl. No.: 843,211

[22] Filed: Feb. 28, 1992

[51] Int. Cl.⁵ .................... B60R 25/00; G08B 15/02
[52] U.S. Cl. ...................................... 340/428; 109/32; 222/3; 222/61; 340/541; 340/691; 340/693
[58] Field of Search ............... 340/428, 426, 691, 693, 340/541; 222/3, 61, 649; 109/32, 31, 20; 116/33, 214

[56] References Cited

U.S. PATENT DOCUMENTS

| | | | |
|---|---|---|---|
| 2,094,261 | 9/1937 | Burley | 109/32 |
| 2,224,894 | 12/1940 | Brendler | 109/32 |
| 3,706,966 | 12/1972 | So et al. | 340/428 |
| 3,710,317 | 1/1973 | Colsen et al. | 340/428 |
| 3,805,732 | 4/1974 | Reed | 116/94 |
| 3,915,103 | 10/1975 | Rupert et al. | 252/552 |
| 3,991,688 | 11/1976 | Winters | 109/32 |
| 4,068,780 | 1/1978 | Fegley | 222/5 |
| 4,099,158 | 7/1978 | Grammenopoulos | 340/428 |
| 4,449,474 | 5/1984 | Mariol | 116/214 |
| 4,479,110 | 10/1984 | Cipri | 340/430 |
| 4,996,515 | 2/1991 | Schaffer et al. | 340/426 |
| 5,034,730 | 7/1991 | Lin | 222/3 |

Primary Examiner—Glen P. Swann, III
Attorney, Agent, or Firm—Renner, Kenner, Greive, Bobak, Taylor & Weber

[57] ABSTRACT

A theft deterrent device (10) is provided for enclosures such as dwellings, motor vehicles and the like, having one or more entranceways. The device is adapted to be quickly and easily installed within such enclosures and is connected electrically with pre-existing electrical circuitry of the enclosure, causing the device to emit a noxious gas, upon unauthorized entry into the enclosure via one of the entranceways. The noxious gas renders the enclosure temporarily uninhabitable. The device may be activated or deactivated remotely from outside the enclosure. The device also includes other safety features to prevent accidental discharge of the noxious gas.

12 Claims, 4 Drawing Sheets

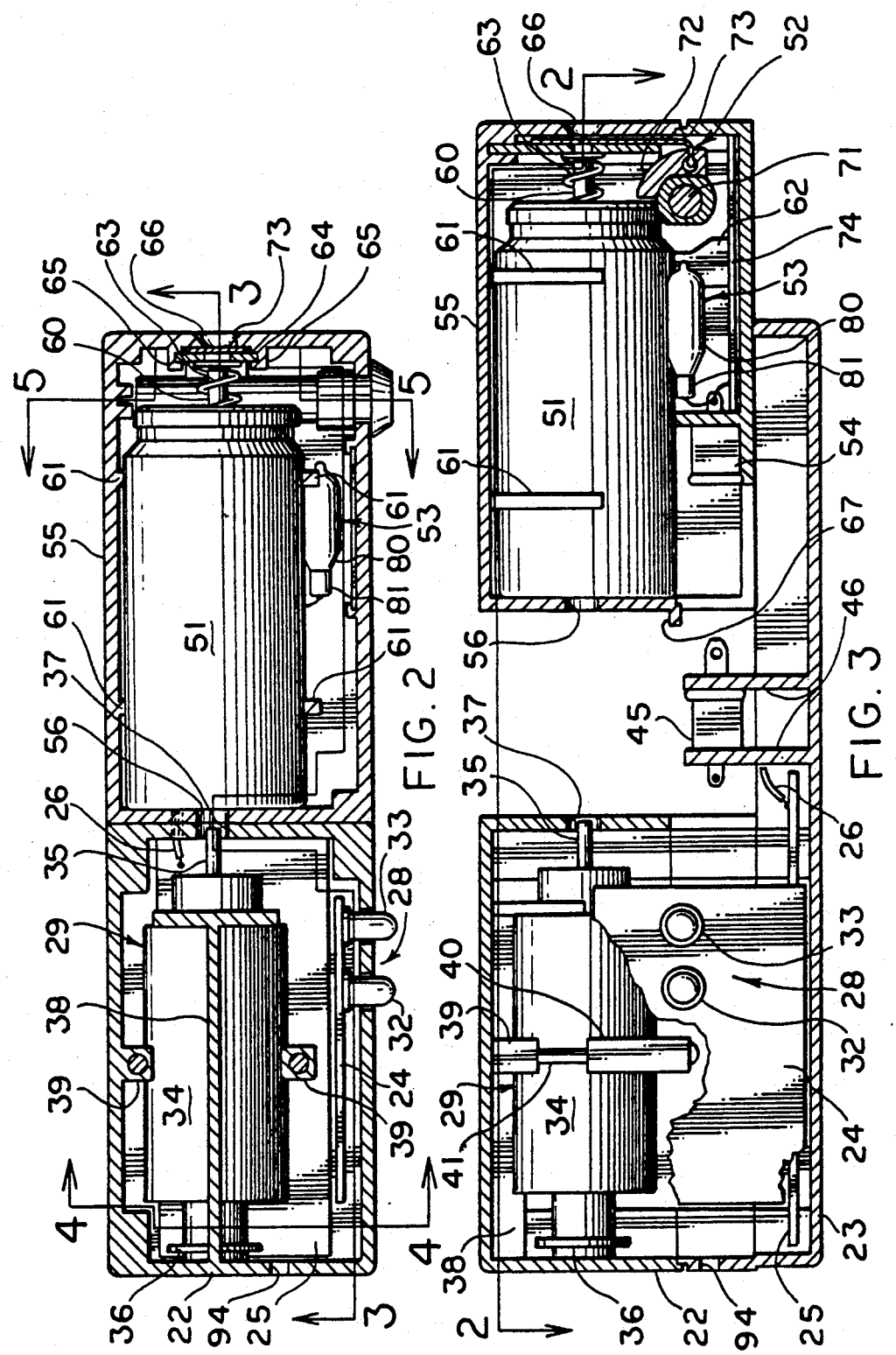

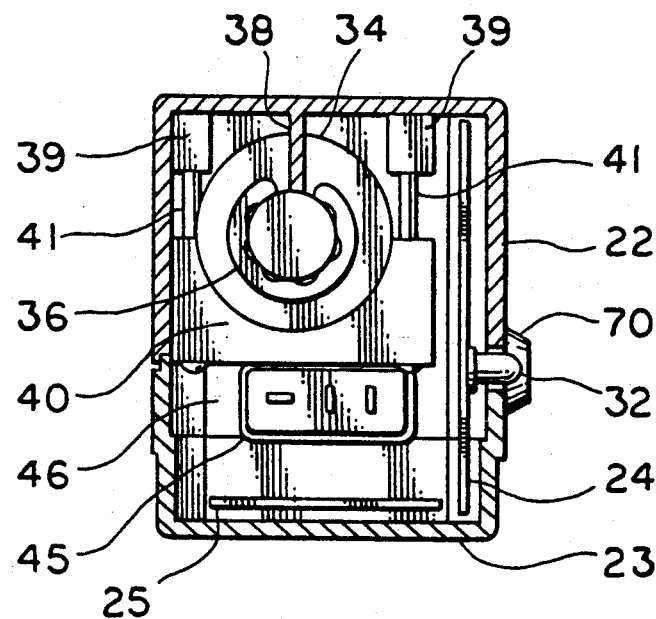

REMOTE CONTROLLED THEFT DETERRENT SYSTEM

TECHNICAL FIELD

In general, this invention relates to a deterrent device for use in securing enclosures from break-ins and thefts. In particular, this invention relates to a novel device for use in enclosures such as dwellings, motor vehicles and the like, which device may be quickly and easily installed within such enclosures, the device being connected electrically with pre-existing, electrical circuitry of the enclosure and being capable of releasing a noxious gas so as to render the enclosure temporarily uninhabitable.

BACKGROUND OF THE INVENTION

Noxious gases have been used in the art in devices that are used to protect banks, jewelry stores, homes, automobiles and the like from break-ins and thefts, but the devices heretofore known have failed to provide the beneficial attributes of the present remote controlled theft deterrent device, as will be readily apparent from the disclosure set forth herein.

U.S. Pat. No. 2,094,261 discloses a theft deterrent device for use in conjunction with automobiles, wherein a deterrent gas is emitted through openings extending outwardly of the vehicle, in the event that burglars attempt to get into the vehicle from outside the vehicle. This device, however, does not render the interior of the automobile uninhabitable and uses mechanical means, and not electrical means, to cause the release of the noxious gas.

In U.S. Pat. No. 3,706,966 an automotive burglar alarm employs an inductive pick-up coil to monitor current flow from the vehicle battery. Opening a door having a door light switch triggers a conventional audio alarm because current flow is produced. The use of noxious gas, direct connection to a dome light circuit and remote control are not disclosed or contemplated.

U.S. Pat. No. 3,710,317 discloses an auto alarm system wherein the alarm may be triggered by at least one of the automotive courtesy or dome light switches which are operated by opening the door of the vehicle. This device does not use noxious gases and is not controlled remotely.

U.S. Pat. No. 3,805,732 discloses a combination burglar alarm and a compressed noxious gas intruder repeller, both of which are simultaneously activated by mechanical means upon opening of a door of an enclosure or the like. However, no remote control of the device is possible, unlike the device of the present invention. Also, special mechanical attachments are required for causing the activation of this device, as opposed to the device of the present invention, which is quickly and easily connectable to the pre-existing electrical system of the enclosure to be protected.

U.S. Pat. No. 3,915,103 discloses a "gas" security system wherein a noxious gas is emitted into an enclosure, when a valve, such as an electrically operated solenoid valve is actuated because of an attempt to break into the enclosure. However, there is no indication that this device may be remotely controlled, whereas the device of the present invention is remote controlled. Also, the "gas" security system clearly involves the design and installation of an actuating circuit, unlike the system of the present invention, which utilizes a pre-existing circuit within the enclosure to be protected.

U.S. Pat. No. 3,991,688 discloses a security device which discharges a disabling gas such as tear gas or the like upon intrusion into the area to be protected, the gas discharge being actuated by mechanical means. Importantly, this device cannot be remotely controlled, and it is not electrically actuated. Complicated mechanical means are utilized to provide actuation.

U.S. Pat. No. 4,068,780 discloses a noxious gas device which may be used as an anti-burglar deterrent wherein gas may be discharged into a confined area, the actuation being caused by an electro-thermal strip when the integrity of the area to be protected is violated. This device is not remote controlled and is electro-thermally actuated whereas the device of the present invention is completely electrically actuated.

U.S. Pat. No. 4,099,158 discloses an electronic burglar alarm which can be connected into the electrical system of a vehicle to be protected and which may be operated by the switch activated when the door of the vehicle is opened. The switch used for this patent is the same switch that normally operates the dome light. Again, no noxious gases are utilized in this device, and the device is not remotely operable.

U.S. Pat. No. 4,479,110 discloses a burglar alarm for a vehicle which is also connected to the electric circuit of a door switch that operates the interior light of the vehicle. As in U.S. Pat. No. 4,099,158, no noxious gases are utilized in this device and the device cannot be remotely operated.

As explained above, and as will become clear upon reading the description to follow, none of the above devices individually offer the beneficial advantages of the security system of the present invention.

SUMMARY OF INVENTION

It is an object of the present invention to provide an improved, easy to install, theft-deterrent device.

It is another object of the present invention to provide a theft deterrent device which can be simply, efficiently and economically manufactured.

It is yet another object of the present invention to provide a theft deterrent device, as above, in which an unauthorized intrusion into the enclosure to be protected triggers the release of a noxious gas within the enclosure, rendering the enclosure temporarily uninhabitable.

It is still another object of the present invention to provide a theft deterrent device, as above, in which the number of component parts is minimized and includes a single easily replaceable unit including all components consumed each time the device is triggered.

It is a further object of the present invention to provide a theft deterrent device, as above, which is connected to a pre-existing electric circuit within the enclosure to be protected such that, after arming, operation of the pre-existing circuit causes the device to be triggered.

It is yet a further object of the present invention to provide a theft deterrent device, as above, which can be remotely controlled by the owner of the enclosure to be protected.

It is still a further object of the present invention to provide a theft deterrent device, as above, which includes a flashbulb that is lit upon triggering of the device and which also alerts the owner of the enclosure that the device has been triggered and requires a new replacement unit for rearming.

It is an additional object of the present invention to provide a theft deterrent device, as above, which includes a plurality of interlocks to insure the device is not accidentally triggered and the noxious gas released.

It is yet an additional object of the present invention to provide a theft deterrent device, as above, wherein such interlocks include a switch for disconnecting power to the device and a safety shield, operated by the switch, which precludes release of the noxious gas.

It is still an additional object of the present invention to provide a theft deterrent device, as above, which device can alternately utilize a battery system as its source of power.

It is even another object of the present invention to provide a theft deterrent device, as above, which is most beneficially adapted for use in protecting an automobile wherein it may be connected to the dome light-/door light circuit of the automobile so as to be activated when any door of the automobile is opened.

These and other objects of the present invention will become apparent from the description to follow, and are accomplished by the improvements hereinafter disclosed and claimed. Various modifications and changes in construction are comprehended within the scope of the appended claims.

In general, an apparatus for minimizing loss from an unauthorized entry into an enclosure includes a circuit for detecting unauthorized entry into the enclosure, a noxious gas capable of rendering the enclosure temporarily uninhabitable by humans, a canister for holding the noxious gas and selectively delivering the noxious gas into the enclosure, and a controller for monitoring the detector circuit and triggering the delivery of the noxious gas into the enclosure by the canister upon an unauthorized entry into the enclosure.

BRIEF DESCRIPTION OF THE DRAWINGS

FIG. 2 is a sectional plan view of the theft deterrent device of the present invention taken substantially along line 2—2 of FIG. 3, showing the canister unit engaged with the base of the power unit.

FIG. 3 is a sectional front elevation of the theft deterrent device of the present invention taken substantially along line 3—3 of FIG. 2, showing the canister unit partially disengaged from the base of the power unit.

FIG. 4 is a sectional left side elevation of the power unit taken substantially along line 4—4 of FIG. 2.

FIG. 5 is a sectional right side elevation of the canister unit taken substantially along line 5—5 of FIG. 2, and depicting the shield in its disarmed position.

PREFERRED EMBODIMENT FOR CARRYING OUT THE INVENTION

Figure 1:
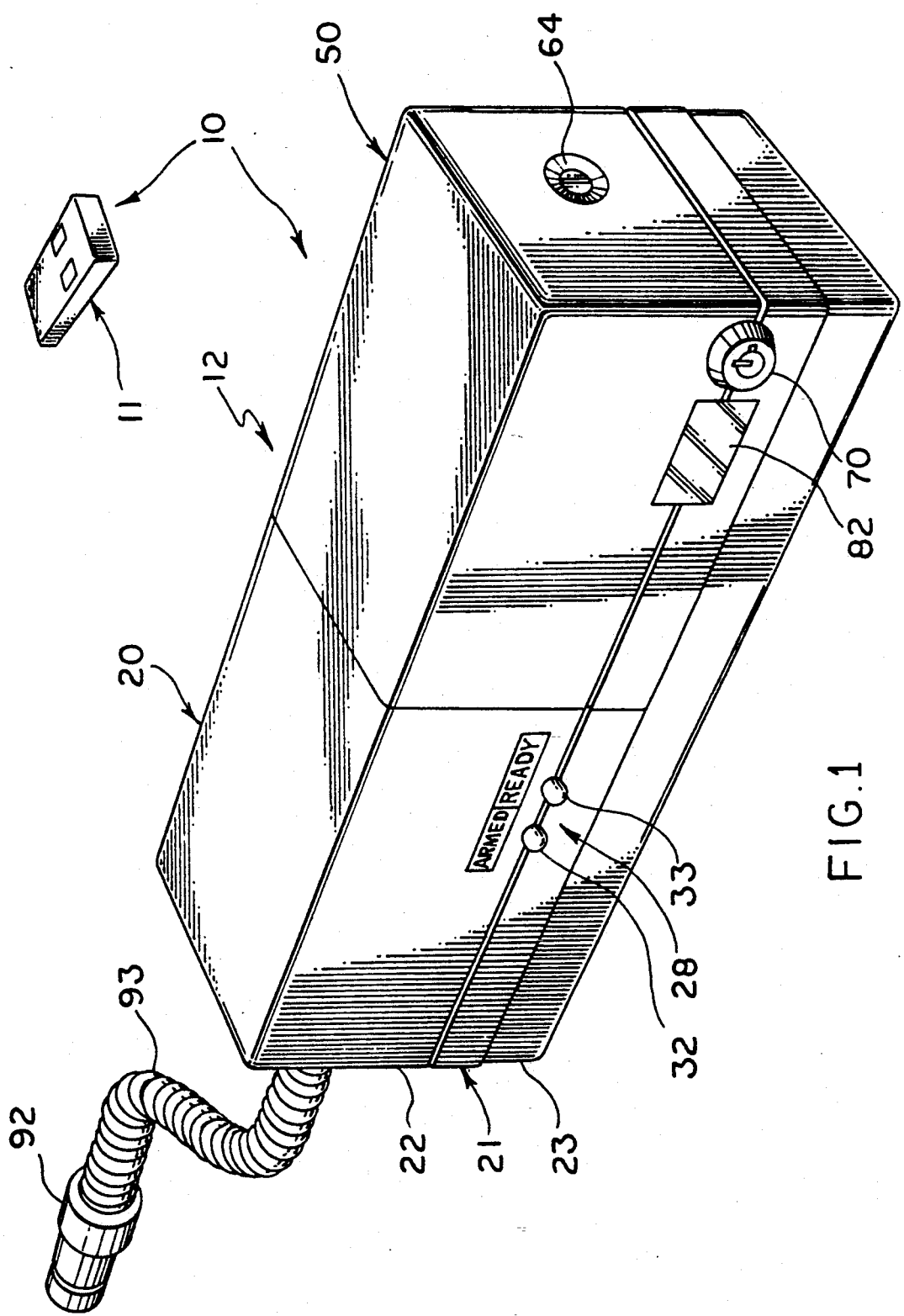
FIG. 1 is a perspective view of an exemplary theft deterrent system of the present invention including a theft deterrent device shown with the canister unit engaged with the base of the power unit, and an exemplary remote control.

FIG. 1 presents in perspective view an exemplary embodiment of a theft deterrent system in accordance with the concepts of the present invention, indicated generally by the numeral 10. System 10 includes a remote control unit 11 and a theft deterrent device 12, which in turn includes broadly a power unit 20 and a canister unit 50. Remote control unit 11 may be a conventional radio frequency control for furnishing arm and disarm commands to device 10 through remote receiver board 25 (FIGS. 2 and 3).

Power unit 20 includes a housing 21 having a substantially rectangular upper section 22 and a longer, lower base section 23, and, as best seen in FIGS. 2 and 3, a control printed circuit (PC) board 24, a remote control receiver PC board 25, a visual status indicator 28 and a canister actuation mechanism 29. Control PC board 24 carries a control circuit further detailed hereinafter and may be mounted by means not relevant hereto substantially vertically within housing 21. Visual status indicator 28 may include a red light emitting diode (LED) 32 and a green LED 33 mounted to control PC board 24 whereby the illuminated ends thereof extend through and is visible when looking at the front face of upper section 22. Remote control receiver PC board 25, which may include an antenna wire 26, receives radio or other wireless frequency control signals from remote control unit 11 and may be mounted by means not relevant hereto within lower section 23 of housing 21 beneath upper section 22.

Canister actuation mechanism 29 may include a solenoid 34 having a plunger shaft 35 whose forward travel when solenoid 34 is energized is fixed by the distance between the rear of solenoid 34 and a stop washer 36 mounted upon shaft 35. Solenoid 34 is mounted lengthwise in the top half of housing upper section 22 allowing shaft 35 to pass through an opening 37 in the sidewall of housing upper section 22 closest to canister unit 50. One convenient manner of mounting solenoid 34 utilizes a vertical placement rib 38 (FIG. 4) and a plurality of screw receiving bosses 39 which may be integrally formed with housing upper section 22 between which solenoid 34 is positioned and secured by yoke 40 and screws 41.

A quick disconnect plug 45 having a suitable number of terminals for rapid electrical connection and disconnection between power unit 40 and canister unit 50 as hereinafter further explained, may be centrally disposed within base 23 and carried by mounting ribs 46 (FIGS. 3 and 4) which may be integrally formed with base 23.

Referring now to FIGS. 2, 3 and 5, canister unit 50, seen in overall perspective in FIG. 1, includes a substantially cylindrical gas canister 51, a safety interlock assembly 52, a visual discharge indicator 53, and a quick disconnect jack 54 all carried within a substantially rectangular canister housing 55 suitable for slidably removable engagement with base 23 as explained hereinbelow.

Gas canister 51, which contains under pressure the noxious gas to be used to make the environment of device 10 temporarily uninhabitable in the event of an unauthorized intrusion, includes an internal valve for selective discharge of the gas therein when its valve stem 60 is depressed. Gas canister 51 is mounted lengthwise in the top half of canister 55 such that its longitudinal axis is aligned with opening 37 and the solenoid shaft 35 which may pass therethrough, and a corresponding opening 56 in canister housing 55. One convenient manner of mounting gas canister 51 utilizes a plurality of vertical placement ribs 61 which may be integrally formed with canister housing 55 along its side and top walls, and a support rib 62 integrally formed along its bottom. A spring 63 for precluding inadvertent actuation of the valve may be mounted to canister 51 coaxial with valve stem 60 for engagement with a baffle 64 held to the side wall of canister housing 55 adjacent a tapered discharge port 66 by flange brackets 65. Tapered port 66 for discharge of the gas within gas canister 51 is provided in the side wall of canister housing 55 aligned with valve stem 60. Mounted in this configuration it will be appreciated that actuation of solenoid 34 will drive shaft 35 into engagement with canister 51, overcoming the bias of spring 63 and pushing valve stem 60 into canister 51, thereby allowing release of the gas therein through tapered port 66 into the environment protected by the present invention.

The noxious substance used in the canister 51, whose capacity may be about two ounces, is a mixture of ingredients consisting of a pressurized gas or gases, an active eye and lung irritant and a liquid to dissolve or suspend the active ingredients. One suitable composition is commercially available from Aerko International of Ft. Lauderdale, Fla., and includes the following ingredients in amounts listed in weight percents: a pressurized gas ingredient (30%) including a mixture of equal weight percents of propane and isobutane; active ingredients including 2-chlorobenzalmalononitrile (1%) and oil of red pepper (capsicum) (1%); and a liquid ingredient including a chlorinated hydrocarbon (68%).

The ingredients are driven out of the canister by the pressurized gas when the canister valve is opened. A mixture of 50% propane and 50% isobutane develops satisfactory pressures under normal temperature conditions. The active eye and lung irritant 2-chlorobenzalmalononitrile is known under the trade name CS. It is also known as 2-chlorobenzylidene malononitrile and as o-chlorobenzylidene malononitrile or as Beta, beta-dicyano-o-chlorstyrene. CS has a Permissive Exposure Limit (PEL) value of 0.05 parts per million (ppm), as set forth in the relevant Material Safety Data Sheet from Federal Laboratories, Inc. of Saltsburg, Pa. The CS compound appears to be an effective eye irritant at 1–5 mg/m$^3$ and effective lung irritant at about 10–20 mg/m$^3$. The oil of red pepper is a general eye and lung irritant. The dissolving or suspending liquid is a chlorinated hydrocarbon and is proprietary to Aerko International, Inc.

The amount of noxious substance to be released in any given environment to be protected, such as a vehicle, depends on the volume of the vehicle and size of the canister. Concentrations of CS in the range of about 1 mg/m$^3$ to 20 mg/m$^3$ in the air can be considered an effective irritant range, although higher values may be used. For any given situation, some adjustment might be necessary if windows or doors are open, to allow for a change in the effective volume.

Safety interlock assembly 52 may include a tubular key lock 70 carried within canister housing 55 by any suitable means and having a cam shaft 71 and cylindrical surface 72 of approximately ninety degrees arcuate extent. In this manner when key lock 70 is in its locked position the top edge of surface 72 engages a portion of the top of canister 51, blocking any travel of canister 51 that would depress valve stem 60 and release the gas therein, thereby providing a first mechanical interlock against the inadvertent triggering of device 10. When key lock 70 is rotated clockwise toward its unlocked position, the upper edge of cam surface 72 is moved clear of canister 51 and its lower edge may contact support rib 62, stopping such rotation at approximately ninety degrees.

A second mechanical interlock involves blocking tapered port 66 with a shield 73 which may slidably pass between baffle 64 and the inner wall of canister housing 55 adjacent tapered port 66. The lower end of shield 73 may be rolled and inserted into a bore within the cylindrical surface 72 of cam shaft 71 nearby its lower edge such that when key lock 70 is in its locked position shield 73 extends upward blocking tapered port 66, and when key lock 70 is in its unlocked position shield 73 is partially withdrawn and wrapped around cylindrical surface 72, leaving tapered port 66 open to valve stem 60.

Safety interlock assembly 52 may provide a third mechanical interlock by effecting a disconnection of electrical power to power unit 20 whenever key lock 70 is in the locked position. This is accomplished with two flat, electrical bus contacts 74 (FIG. 5) positioned on either side of support rib 62 secured to the inside bottom of canister housing 55 and electrically connected to two of the terminals within jack 54. Bus contacts 74 are of such length that when key lock 70 is in the unlocked position, shield 73, which is preferably made of a suitably electrically conductive, ductile material such as brass, contacts and electrically connects both bus contacts 74, and when in the unlocked position does not contact the same.

Visual discharge indicator 53 may include a flashbulb 80 inserted in a socket 81 to facilitate replacement, which socket may be connected by wires to two of the terminals furnished by jack 54. A clear window 82 is provided in front of flashbulb 80 to allow it to be visible from outside the device 10. Because flashbulbs change color upon discharge, a quick glance at the appearance of flashbulb 80 will reveal whether or not device 10 has been triggered and replacement of canister unit 51 is necessary. A flashing LED (not shown) also visible through clear window 82 may be provided as a further indication of discharge status.

Figure 6:
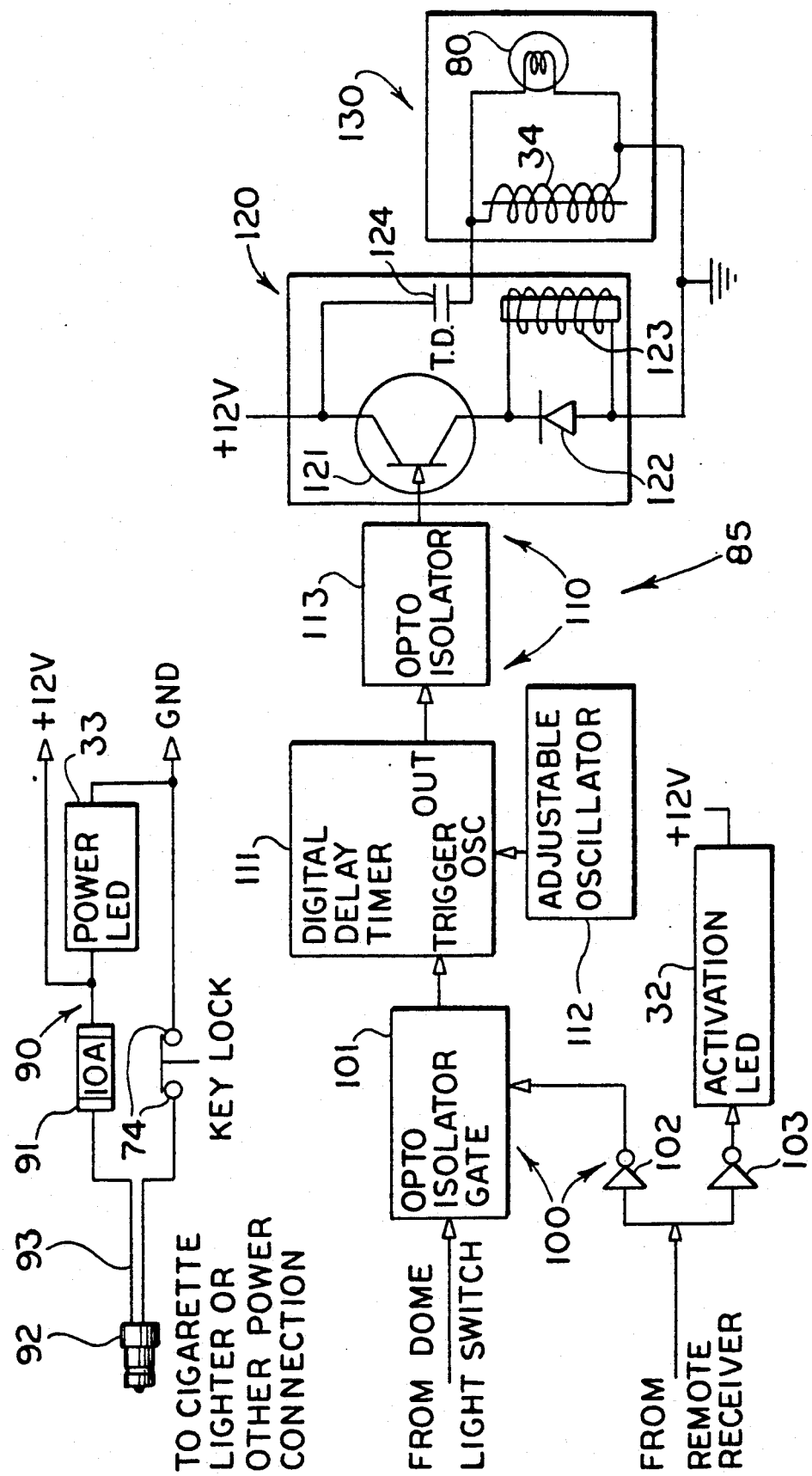
FIG. 6 is a hybrid block and schematic diagram of an exemplary electrical control circuit in accordance with the present invention.

FIG. 6 presents in partial block and partial schematic diagram form an exemplary electrical control circuit in accordance with the present invention, generally indicated by the numeral 85. Control circuit 85 can be seen to include broadly power circuit 90, activation circuit 100, time delay circuit 110, alarm switch 120 and alarms 130.

Power circuit 90 electrically connects theft deterrent device 10 to a vehicle power source, such as through cigarette lighter plug 92 and power cord 93 passing through an opening 94 in the side wall of housing upper section 22. Key lock 70 contacts 74 are electrically connected in series in the ground conductor (through plug 45 and jack 54) before the ground conductor is electrically connected to the remainder of control circuit 85, allowing manual power on/off control of theft deterrent device 10 as previously described. As an additional safety precaution, a fuse 91 of suitable type and size may be electrically connected in series with the positive 12 volt line from power cord 93 before passing to the remainder of control circuit 85. The green, power LED 33 may be electrically connected between the end of fuse 91 not connected to power cord 93 and the contact 74 not electrically connected to power cord 93. Configured in this manner power LED 33 will be illuminated and power furnished to the remainder of control circuit 85 whenever key lock 70 is in its unlocked position. If desired for greater visibility, flashing LEDs may be employed in control circuit 85.

Activation circuit 100 includes an opto-isolator gate 101, such as Model number 4N35/4N36 manufactured by Motorola, Inc. of Chicago, Ill., and two inverting hex buffers 102, 103, such as are included with a Model MC14049 integrated circuit manufactured by Motorola, Inc. Buffers 102 and 103 both receive a signal from remote receiver board 25 indicative of the receipt of an activation signal from remote control 11. The respective outputs from buffers 102 and 103 are electrically connected to opto-isolator gate 101 and red activation LED 32, the opposite end of the latter of which is electrically connected to the positive 12 volt circuit power. Opto-isolator 101 is also electrically connected to the dome light.

Time delay circuit 110 includes a digital delay timer 111 such as a Model LS7210 integrated circuit available commercially from LSI Logic, Inc. of San Francisco, Calif., an adjustable oscillator 112 and a second opto-isolator gate 113. The trigger input of timer 111 is electrically connected to opto-isolator gate 101, the oscillator input electrically connected to adjustable oscillator 112, and its output electrically connected to opto-isolator 113. Timer 111 generates an output signal to opto-isolator 113 after a time delay preselectable by adjustable oscillator 112 which may include a series RC network (not shown) whose resistance is adjustable by a potentiometer (not shown) which thereby selects the time delay. Opto-isolator 113, which may be the same as opto-isolator 101, furnishes a noise-immune signal to alarm switch circuit 120.

Alarm switch 120 includes a general purpose switching transistor 121 such as a type 2N2222 NPN transistor whose collector is electrically connected to the positive power supply and whose emitter is electrically connected to the cathode of a type 9N4001 blocking diode 122, and a relay 123 whose coil is electrically connected in parallel with blocking diode 122 and having a normally open contact set 124 one side of which is electrically connected to the positive power supply. Contact set 124 may include a time delay (T.D.) to eliminate the rapid cycling of solenoid 34 if the selected interior light circuit is rapidly cycled on and off. The anode of blocking diode 122 is electrically connected to ground.

Alarm circuit 130 may be viewed to include flashbulb 80 and solenoid 34. Solenoid 34 may be a tubular DC solenoid suitable for actuating the canister 51, such as a Model 28-458 Tubular DC Solenoid commercially available from Detroit Coil Company of Ferndale, Mich. One end of the coil of solenoid 34 and one end of flashbulb 80 are electrically connected to ground while the opposite ends thereof are electrically connected to the side of contact set 124 not electrically connected to the positive power supply.

Operation of circuit control circuit 85 is straightforward, and is begun with inserting cigarette lighter plug 92 into the vehicle cigarette lighter, turning key lock 70 to the unlocked position, and insuring vehicle power is available at the cigarette lighter, whereupon power circuit 90 furnishes power to theft deterrent device 10 and illuminates power LED 33. Upon receipt of an activation signal from remote receiver 25, activation LED 32 is turned on. Thereafter the next time a door is opened and dome light switch closed, opto-isolator/gate 101 triggers timer 111. Timer 111 generates an output signal which results in opto-isolator 113 changing transistor 121 from a cutoff to a forward bias operating state. This, in turn, produces a current in the coil of relay 123, closing contact set 124, furnishing a current path for solenoid 34 and flashbulb 80. Once energized, solenoid shaft 35 is electromagnetically driven into and releases the gas within canister 51.

After the delay selected by adjustable oscillator 112, timer 111 changes the logic level of its output signal which results in opto-isolator 113 returning transistor 121 to cutoff, and, in turn, the deenergization of solenoid 34 and cessation of gas release from canister 51. Thus, this delay sets the amount of time of discharge of canister 51, which should be chosen to insure a sufficient gas concentration level is developed within the enclosure before operation ceases. In the example given herein, about 7 to 10 seconds may be found to be an adequate delay.

The exemplary device depicted herein may be quickly and easily installed in a typical passenger automobile, beginning with mounting device 10 in the vehicle by any convenient means. Base 23 may be formed to facilitate such mounting. For example, base 23 of device 10 depicted herein is recessed to be held with velcro or attached to a sheet metal bracket (not shown).

Next, device 10 may be electrically connected to the vehicle interior light and power circuits, preferably in the most unobtrusive manner possible. Thus, the housing for the dome light or interior door light is opened and connected to control circuit 85 as described above. Easily installable and removable connectors such as "alligator" clips may be included with device 10 to facilitate this connection. The cigarette lighter should be removed from its jack and cigarette lighter plug 92 inserted. At this point green LED 33 will illuminate, indicating power is available and device 10 is ready for arming.

Once device 10 is securely positioned and electrically connected a charged canister unit 50 should be installed by placing it upon base 23 and sliding it until plug 45 and jack 54 mate and the side walls of housing upper section 22 and canister housing 55 adjoin. In this position a horizontal lip 67 integrally formed into canister housing 55 passes through a corresponding opening in base 23, precluding rotation of canister housing 55 during operation. Also, in addition to providing electrical connection, the coupling of plug 45 and jack 54 mechanically secures canister unit 50 to device 10.

Next, the key to key lock 70 should be inserted and turned clockwise (top to right) ninety degrees, which completes the circuit for providing power to device 10 and opens the shield 73. At this time remote control unit 11 should still be off. The user should take remote control 11, step outside the automobile and close and lock the doors. Thereafter, to arm and disengage the last safety mechanism the arm button of remote control unit 11 is pressed and device 10 is fully activated. At this point red LED 32 will illuminate, indicating that device 10 is armed.

The user may disarm device 10 and enter the vehicle harmlessly, by first pressing the disarm button on remote control unit 11 while outside the automobile. Before starting the vehicle, it is preferable to rotate key lock 70 counterclockwise to the locked position, reengaging the several safety interlocks it provides.

It should now be appreciated that if a door is opened without disarming device 10, the noxious gas will be released into the automobile, forcing the thief or miscreant to leave the automobile without stealing, looting or doing any further property damage to the automobile. Flashbulb 80 will be lit simultaneously, providing a visual indication that the device has been triggered and the unit discharged. It will also be appreciated that given the several mechanical and electrical interlocks included therein, the likelihood of inadvertent or accidental actuation is substantially eliminated.

The present embodiment has been described with respect to a preferred embodiment. Modifications and alterations will occur to others upon the reading and understanding of the specification. It is intended that all such modifications and alterations be included insofar as they come within the scope of the invention as claimed or equivalents thereof.

What is claimed is:

1. An apparatus for minimizing loss from an unauthorized entry into an enclosure, comprising:
   circuit means for detecting unauthorized entry into the enclosure;
   a noxious gas capable of rendering the enclosure temporarily uninhabitable by humans;
   canister means for holding said noxious gas and selectively delivering said noxious gas into said enclosure, said canister means including valve means for controlling said selective delivery of said noxious gas therefrom, and further including solenoid means for selectively operating said valve means to deliver said noxious gas;
   control means for monitoring said circuit means and triggering the delivery of said noxious gas into said enclosure by said canister means upon an unauthorized entry into the enclosure;
   remote control means for generating a wireless signal for selectively arming and disarming said control means, said control means including receiver means for receiving said wireless signal and selectively arming and disarming the device; and
   safety means for precluding the inadvertent delivery of said noxious gas from said canister means into the enclosure.

2. An apparatus, as set forth in claim 1, wherein there is an interior light circuit for illuminating the interior of the enclosure, and said control means monitors actuation of said interior light circuit.

3. An apparatus, as set forth in claim 1, wherein said valve means is biased closed and said solenoid means includes a shaft which upon energization of said solenoid means acts against said canister means overcoming said valve means bias and opening said valve means.

4. An apparatus, as set forth in claim 1, wherein said safety means includes shield means for selectively blocking said delivery of noxious gas from said canister means into the enclosure, said control means receives electrical power, and said safety means further includes electrical interlock means for selectively disconnecting electrical power to said control means.

5. An apparatus, as set forth in claim 4, wherein said electrical interlock means includes bus means for conducting electrical power to said control means, said shield means electrically connecting said bus means when said shield means is not blocking the delivery of noxious gas from said canister means.

6. An apparatus, as set forth in claim 5, wherein said safety means further includes lock means for selectively actuating said shield means and said electrical interlock means.

7. An apparatus for minimizing loss from an unauthorized entry into an enclosure comprising:
   circuit means for detecting unauthorized entry into the enclosure;
   a noxious gas capable of rendering the enclosure temporarily uninhabitable by humans;
   canister means for holding said noxious gas and selectively delivering said noxious gas into said enclosure;
   control means for monitoring said circuit means and triggering the delivery of said noxious gas into said enclosure by said canister means upon an unauthorized entry into the enclosure; and
   first housing means for carrying said control means and said circuit means, and second housing means for carrying said canister means, said second housing means selectively slidably engaging said first housing means.

8. An apparatus, as set forth in claim 7, further including electrical plug means for establishing a plurality of electrical contacts between said first housing means and said second housing means upon engagement therebetween and securing said engagement of said first housing means and said second housing means by interference fit between said plurality of electrical contacts.

9. An apparatus, as set forth in claim 7, further including a lamp means carried within said first housing means for furnishing a visual indication of the operational status of the device.

10. An apparatus, as set forth in claim 9, further including second lamp means carried within said second housing means for furnishing a visual indication of delivery of noxious gas from canister means.

11. An apparatus, as set forth in claim 10, wherein said second lamp means is a flashbulb which fires upon said delivery of noxious gas from said canister means.

12. An apparatus, as set forth in claim 11, wherein the enclosure is an automobile and said circuit means monitors an interior dome light.

* * * * *